United States Patent [19]

Goodrich et al.

[11] 3,948,770

[45] Apr. 6, 1976

[54] METHOD FOR CLARIFYING OILY WATER MIXTURES

[75] Inventors: Robert R. Goodrich, Morristown; Edward R. Corino, Succasunna, both of N.J.

[73] Assignee: Exxon Research and Engineering Company, Linden, N.J.

[22] Filed: Apr. 24, 1975

[21] Appl. No.: 571,268

Related U.S. Application Data

[63] Continuation of Ser. No. 385,604, Aug. 3, 1973, abandoned.

[52] U.S. Cl. ................................... 210/40; 210/54
[51] Int. Cl.² ........................................ B01D 15/00
[58] Field of Search .......... 210/DIG. 21, 40, 52, 53, 210/54, 51, 59, 36

[56] References Cited
UNITED STATES PATENTS

| | | | |
|---|---|---|---|
| 2,827,964 | 3/1958 | Sandiford et al. | 210/DIG. 21 |
| 3,128,249 | 4/1964 | Pye et al. | 210/53 |
| 3,130,167 | 4/1964 | Green | 210/52 |
| 3,252,899 | 5/1966 | Rice et al. | 210/40 |
| 3,487,928 | 1/1970 | Canevari | 210/40 |
| 3,634,227 | 1/1972 | Patterson, Jr. | 210/DIG. 21 |

*Primary Examiner*—Charles N. Hart
*Assistant Examiner*—Benoit Castel
*Attorney, Agent, or Firm*—FH. N. Wells Wells; D. Donald Paris

[57] ABSTRACT

Mixtures of finely dispersed oil droplets in sea water which are often present in oil tanker compartments may be effectively separated by a chemical flocculating agent comprising a dry powdered mixture of an anionic polyelectrolyte and a sodium or calcium montmorillonite clay.

6 Claims, No Drawings

METHOD FOR CLARIFYING OILY WATER MIXTURES

This is a continuation of application Ser. No. 385,604, filed Aug. 3, 1973, and now abandoned.

BACKGROUND OF THE INVENTION

The present invention relates to the problem of coalescing finely dispersed droplets of oil in water, in a similar manner to the flocculation process described in U.S. Pat. No. 3,487,928.

Finely dispersed particles of oil in water are commonly found in the slop tanks of oil tankers. They derive particularly from the washing of oil cargo tanks by vigorously spraying sea water against the tank walls and bottom. Water must be separated from the oil and the oil recovered in order to avoid pollution of the sea. This is commonly done in conjunction with a loading and handling method commonly known as "Load-on-Top." Water-oil mixtures are pumped into slop tanks were separation occurs. When very small droplets are present, the separation by gravity is extremely slow and some assistance is required in order to effect an essentially complete separation. In the prior art patent cited above, a method is disclosed for agglomerating these fine droplets by means of a flocculating agent comprising a sodium montmorillonite clay applied along with a cationic organic agent or glycol. The organic agents create a lipophilic surface on the clay which tends to acquire the small oil droplets. They bridge over to form larger drops which rise and form a distinct oil phase which can be readily separated.

The interaction of the cationic agent with the clay is believed to be an ion exchange mechanism wherein the sodium ion of the clay is exchanged for the cation of the organic agent. The prior art agent is quite effective in fresh water, but less so in sea water. It is believed that in sea water the presence of sodium ions hinders the ion exchange mechanism necessary to attach the cationic agent to the clay surface. Thus, the combination of clay and cationic agents is less effective in sea water than in fresh water. One of the objectives of the present invention is to provide a substitute flocculating agent which is particularly effective in sea water.

Another disadvantage of the prior art flocculating agent is that it requires that the separate addition of a dry ingredient, i.e. the clay, and a liquid cationic agent. Proper mixing of the relatively small quantities of these ingredients in the large oil tanks made them less desirable than a single packaged ingredient which could be added with more precision and more uniformly. Another objective of the present invention is to provide a single package flocculating agent which may be used effectively onboard oil tankers.

The dry powder flocculating agent which is the subject of the present invention satisfies the foregoing requirements, being particularly effective in sea water when used aboard oil tankers.

SUMMARY OF THE INVENTION

When small quantities of oil are finely dispersed within the relatively large body of water, typically found in the slop tanks of large oil tankers, the settling of the fine droplets of oil is extremely slow. Rapid settling may be obtained by use of a novel flocculating agent which comprises a dry powder mixture of a sodium or calcium montmorillonite clay wth an anionic polyelectrolyte, typically an anionic copolymer of acrylamide. Such a combination of powders may be dispersed within the slop tank wherein it accumulates the fine oil drops, agglomerating them and assisting in their separation from the water by rising to its surface.

The interaction of the clay and anionic polyelectrolyte is an important aspect of the invention. A synergistic effect occurs since neither of the individual components is particularly effective to assist in the settling of the finely dispersed oil droplets. The mechanism by which the clay and polyelectrolyte interact is not clearly understood but is believed to be possibly a combination of electrical effects between the two components and more importantly the polymer bridges the clay and oil droplets to promote agglomeration. The rapid separation which is produced by the novel flocculating agent permits the efficient separation of oil and water, with the oil/floc mixture rising to the surface, thus permitting the disposal of clear water to the sea.

Several methods are available by which the dry powder mixture may be applied, including the following:

1. Using an eductor system operated by water pressure which disperses the powder mixture into the slop tank, preferentially into the oily water layer.
2. Recirculating the slop tank while simultaneously injecting the dry powder mixture near the pump suction.
3. Transferring the oil-water mixture to another tank for settling and, during the transfer, injecting the dry powder flocculant into the transfer pump suction.
4. Injecting the flocculant at a controlled rate directly into the tank washings as they are being transferred into the slop tank during the washing of the oil cargo tanks.

DESCRIPTION OF THE PREFERRED EMBODIMENT

The performance of the flocculating agent disclosed in U.S. Pat. No. 3,487,928 is not effective in sea water as it is in fresh water. Salt water apparently has the effect of hindering the ion exchange of clay and cationic agents which was postulated in the prior art patent, thus making it a less effective agent in salt water than in fresh. The dry powdered mixture of the present invention is very effective in salt water and, in addition, has handling and dispersing advantages over the two-component system which was disclosed in the prior art. This is particularly important for use on-board ship where the simplest possible mode of application is preferred and where it is difficult to disperse small quantities of materials into very large volumes of liquids.

For effective use of the dry powder system, a weight ratio of between 1:100 to 1:400 anionic polyelectrolyte to clay is suitable but, in particular, 1:200 is preferred. However, a range within 1:40 to 1:800 is also within the scope of the invention. This dry powder mixture is added to an oil-water mixture. The proportion of about 100 ppm (wgt.) mixture to water is preferred although compositions within the range of 50 ppm to 200 ppm may also be used. Several commercially available anionic polyelectrolytes have been shown to be effective, for example, Betz Poly-Floc 1100, Dow Purifloc A-23 and Nalco 1060. These materials are copolymers of acrylamide which often have some amide groups replaced by more anodic ones to adjust the anionic character of the polymer. The effectiveness of this composition is shown in the following Table I, which illustrates the substantial improvement in the speed of settling and the residual oil concentration.

TABLE I

| Time Settling, min. | Oil Concentration, ppm (wt.) | |
|---|---|---|
| | Unassisted Settling | With Flocculating Agents |
| 0 | 10,000 | 10,000 |
| 20 | 660 | 50 |
| 40 | 425 | 30 |
| 60 | 325 | 27 |
| 80 | 270 | 25 |
| 100 | 220 | 23 |
| 120 | 190 | 20 |

From a typical application made aboard an actual oil tanker the following table illustrates the effectiveness of the dry powder system of the present invention. It will be noted from the following Table II that even after five day' unassisted settling the oil concentration in the oil-water layer is still high.

TABLE II

| Tank Depth, ft. | Oil Concentration, ppm (wgt) | |
|---|---|---|
| | Unassisted Settling | With Flocculating Agents |
| Bottom | — | — |
| +5 | 680 | 59 |
| +10 | 525 | 50 |
| +15 | 490 | 45 |
| +20 | 510 | 42 |
| +25 | 630 | 40 |
| +30 | > 1,200 | 39 |

The dry mixture has an advantage over the previously disclosed mixtures not only in effectiveness but in its ease of handling. It will be appreciated that when large quantities of water are pumped from one large oil tank to another, particularly during the washing operations, that the volume rate is high and tends to be irregular making it difficult to obtain a uniform dispersion of the flocculating agents. However, dispersing small amounts of flocculating agents into a large volume of relatively stagnant water is also difficult. Several methods may be used for carrying out this operation, which will be described in more detail below. Others might also be advanced which would also provide for a uniform dispersion of flocculating agents and which would include parts of the various methods to be proposed. The preferred method is to disperse the dry powdered mixture by emptying it into a hopper operatively connected with a portable eductor which can be operated by fresh or sea water aboard ship. The mixture of water and powdered flocculating agents is dispersed into a slop tank once the tank is full by a hose introduced into the oily-water layer. In a more sophisticated system a vibrating feeder may be used in order to assure an even more uniform dispersion of flocculant mixture in water. While the foregoing method has been successfully used on board ship in a full slop tank, other techniques would add the power mixture into oily-water mixtures as they are being transferred from one tank to another. Examples of such possibilities are the following:

1. Recirculating the slop tank and injecting the flocculant near the suction of the pump by means of eductor.

2. Transferring the oil-water mixture from the slop tank to another tank for settling and injecting the flocculant at the pump suction during a transfer.

3. Injecting the flocculant at a controlled rate directly into the tank washings as they are transferred into the slop tank during the washing operations.

As has been shown the performance of the dry powdered system is especially effective in speeding the separation of oil and water under difficult conditions aboard ship. It also has the capability of making a superior separation compared to that which has been heretofore available and further improving the operation of existing Load on Top oil-handling systems whereby tank washing is carried out while the ship is underway and only clean ballast water is pumped over the side with residual oil being recovered by loading new cargo on top of the residual oil. Not only does the flocculating a reduction in the amount of pollution caused by oil entrained by water pumped over the ship's side, but, in addition, an economic advantage is obtained in that additional oil is recovered by settling, which may be later picked up by new cargo. Because the flocculant is effective at low dosages, the amount of solids introduced into the crude is insignificant. Thus the flocculant agent obtains a unique dual advantage.

The foregoing description of the preferred embodiments are illustrative of the invention and should not be construed to limit the scope thereof which is defined by the claims which follow.

What is claimed is:

1. A process for rapidly separating fine oil droplets dispersed in sea water comprising the steps of adding in dry form to said sea water a flocculant mixture comprising montmorillonite clay selected from the group consisting of sodium, calcium and forms thereof, with an anionic polyelectrolyte which is an anionic copolymer of acrylamide, said mixture contacting said oil droplets for accumulating and agglomerating said oil droplets to assist in their separation from said water, wherein said mixture has a ratio by weight of about 1:40 to about 1:800 parts of anionic polyelectrolyte to clay and further wherein said flocculant mixture is disposed in said sea water in a ratio of about 50 to about 200 parts per million by weight in sea water, said accumulated and agglomerated oil droplets being permitted to settle substantially to the surface of the water.

2. The process of claim 1 including the steps of recirculating the oil-sea water dispersion to and from a settling tank, and adding said flocculant mixture uniformly to said oil-sea water dispersion during the recirculation.

3. The process of claim 1 wherein said mixture has the ratio of about 200 parts by weight clay to one part of anionic polyelectrolyte.

4. The process of claim 1 wherein said flocculant mixture is disposed in sea water in the ratio of about 100 parts by weight of mixture to one million parts of sea water.

5. The process of claim 1 including the steps of transferring the oil-sea water dispersion into a tank for separation and adding said flocculant mixture uniformly to the oil-sea water dispersion during transfer into said tank.

6. The process of claim 1 including the step of adding said flocculant mixture to a quiescent dispersion of oil in sea water situated in a settling tank, wherein said dispersion is located under a surface layer of oil.

* * * * *